T. PATTISON.
BREAD TOASTER.
APPLICATION FILED JULY 2, 1918.

1,279,144.

Patented Sept. 17, 1918.

INVENTOR
T. PATTISON

BY F. M. Wright
ATT'Y

UNITED STATES PATENT OFFICE.

THOMAS PATTISON, OF SAN JOSE, CALIFORNIA.

BREAD-TOASTER.

1,279,144.

Specification of Letters Patent. Patented Sept. 17, 1918.

Application filed July 2, 1918. Serial No. 243,019.

*To all whom it may concern:*

Be it known that I, THOMAS PATTISON, a citizen of the United States, residing at San Jose, in the county of Santa Clara and State of California, have invented new and useful Improvements in Bread-Toasters, of which the following is a specification.

The present invention relates to improvements in bread toasters, and the object of the invention is to provide a toaster of this character which will be sanitary, by which the bread will be toasted uniformly, which can also be used for cooking material in a vessel placed on the toaster, which can be easily cleaned, with which a comparatively small quantity of fuel will be required for toasting, and which cannot easily change its shape.

Figure 1:
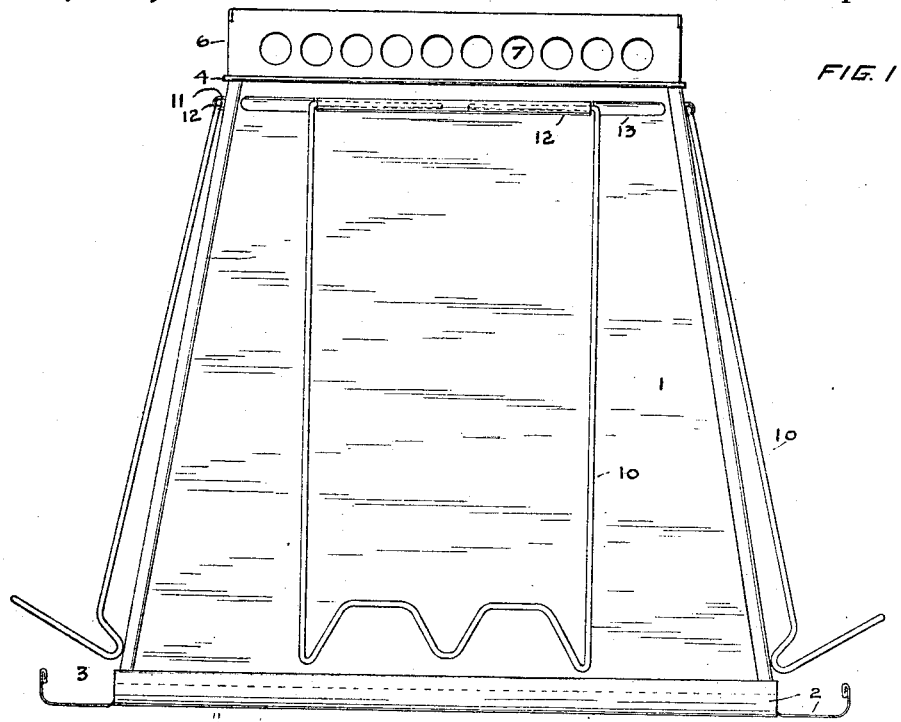
Figure 2:
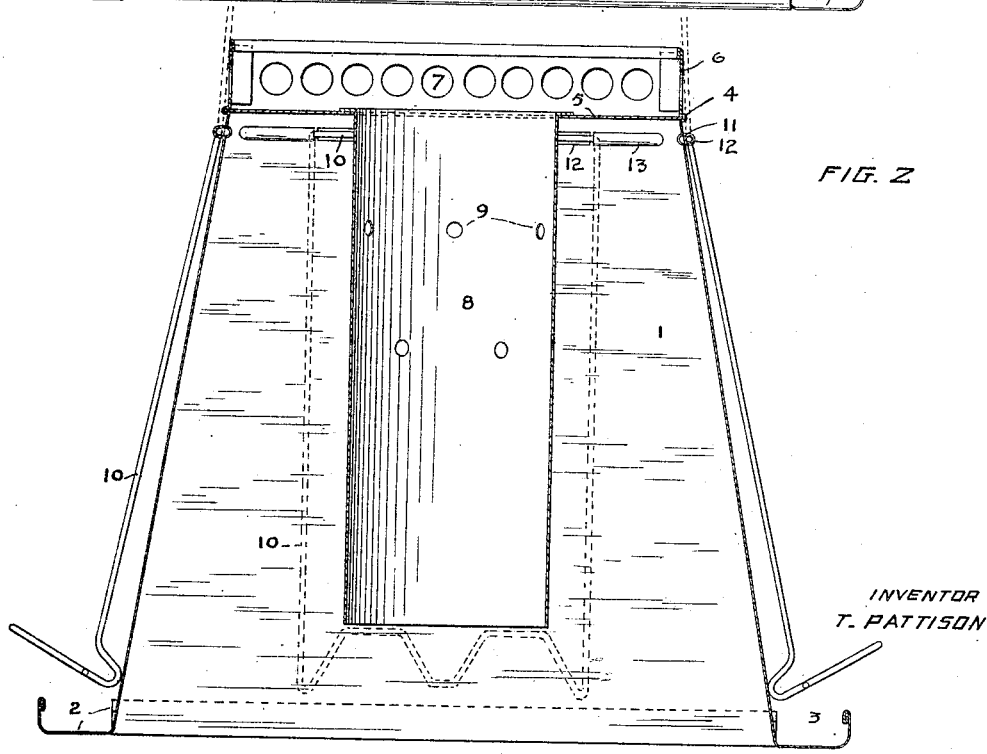

In the accompanying drawing, Figure 1 is a side view of the toaster and Fig. 2 is a vertical sectional view thereof.

Referring to the drawing, the body of my improved toaster is made of a single sheet of metal bent to form four sides 1 and secured together at its edges, forming the sides of a truncated pyramid, also cut and bent to form lower substantially horizontal extensions 2 from said sides having their outer edges turned up and over to form trough 3 open at the ends to receive and retain loose crumbs dropping from the bread or toast, also bent to form at the tops of said sides outwardly extending portions 4 grooved on their inner sides to receive the edges of a square top 5 of the toaster, and also extended upwardly above said grooved portions 4 to form low walls 6 beaded at their upper edges to form a support for a small kettle or other cooking vessel. Said walls 6 have therethrough comparatively large circular apertures 7 situated close together, to permit the escape of the products of combustion from the gas stove or other source of heat below said cooking vessel.

Attached to the edge of a central hole of the top 5 of the toaster is the top of a tube 8, depending therefrom to a level slightly above the bottom of the toaster. The products of combustion arising from the burner can escape only by passing through said tube 8, entering the tube either through comparatively few and small holes 9 in the upper portion of the tube or around the lower edge of the tube. Said products on leaving the tube impinge against the bottom of a cooking vessel laid upon the tops of said walls and escape between the top of the toaster and the bottom of said vessel and out through the apertures in said walls.

The hot products of combustion being retained for a considerable time within the toaster become of uniform temperature and uniformly heat the sides of the toaster and impart a uniform heat to the toast. The slices of bread to be toasted are placed with their lower edges upon supports at the bottoms of hangers 10 of wires side portions of which extend upwardly adjacent to the sides of the toaster and are spaced therefrom sufficiently to prevent the toast being burned by the heated wall of the toaster, the ends of the wire being bent inwardly or toward each other and inserted through holes 11 in the adjacent side wall of the toaster, said holes being between a central horizontally extending outwardly ribbed portion 12 of said side and terminal inwardly ribbed portions 13 thereof. The ends of said wires being received in the groove in the inner surface of the side of the toaster formed by pressing said side wall outwardly to form the rib 12, the hanger 10 can easily be turned to rest against the upper edge of the adjacent low wall 6, and permit side 1 and the trough 3 to be readily cleaned.

The following are the advantages of my improved toaster. It is sanitary, since, on account of the sides of the toaster being entirely free from perforations, none of the products of combustion can impinge against the toast. It has been found in using a toaster of a similar shape, but having perforations through the sides, that the toast acquires a slight "smoky" taste and smell, thought to be due to the depositing on the toast of microscopic particles of carbon. Moreover, the use of such a toaster has been objected to by physicians as being unsanitary on account of the possible absorption into the system of carbon monoxid gas, often one of the products of combustion of gas, carried into the toast by the great draft, received in the minute recesses of the bread or toast, and remaining therein while the toast is being eaten. No result of this character can happen in using my improved toaster.

A further advantage is that, on account of products of combustion not escaping through the main walls of the toaster, but circulating within said walls, the heating of said walls and consequently the toasting of the bread is more uniform than would otherwise be the case.

An additional advantage is that the toaster can be used for cooking without impairing its toasting ability.

It has been pointed out how easily and quickly the toaster can be cleaned, both as to the sides 1 and as to the trough 3, which are entirely free from projections. It may also be observed that the top of the toaster is also free from projections and can quickly be cleaned.

It has been found that less fuel is required for toasting than with a similar device having perforations in its sides, as the hot products of combustion are retained for a considerable time within the toaster before being allowed to escape up the central tube.

It is evident that the toaster is very rigid and cannot easily be changed in shape.

I claim:—

1. A toaster having closed walls in the form of a truncated pyramid open at the bottom, a top secured to said walls, closing the outlet at the upper end of said pyramid and having a central hole, and a tube open at both ends, and of which the upper end is secured to the edge of said hole and the lower end is at a level higher than the bottom of the toaster.

2. As in claim 1, the side walls of the toaster being extended above the top to form a support for a vessel, and the extensions being apertured to permit the escape of the products of combustion from beneath said vessel.

3. As in claim 1, with the provision of hangers for supporting the toast, pivotally connected at their upper ends to the side walls of the toaster.

4. As in claim 1, with the provision that the upper portion of the tube has apertures therethrough.

T. PATTISON.

Copies of this patent may be obtained for five cents each, by addressing the "Commissioner of Patents, Washington, D. C."